United States Patent [19]
Castleberry

[11] Patent Number: 5,107,356
[45] Date of Patent: Apr. 21, 1992

[54] LIQUID CRYSTAL DISPLAY DEVICE WITH BIREFRINGENT FILMS

[75] Inventor: Donald E. Castleberry, Schenectady, N.Y.

[73] Assignee: General Electric Company, Schenectady, N.Y.

[21] Appl. No.: 456,915

[22] Filed: Dec. 26, 1989

[51] Int. Cl.$^5$ ............................................. G02F 1/13
[52] U.S. Cl. ...................................... 359/93; 359/53; 359/62; 359/63; 359/94
[58] Field of Search ............... 350/347 R, 347 E, 337, 350/340, 341, 339 R, 335

[56] References Cited

U.S. PATENT DOCUMENTS

| | | | |
|---|---|---|---|
| 4,398,805 | 8/1983 | Cole ................................. | 350/347 R |
| 4,492,433 | 1/1985 | Imaya et al. .................... | 350/347 R |
| 4,852,976 | 8/1989 | Suzuki .............................. | 350/347 R |
| 4,909,606 | 3/1990 | Wada et al. ..................... | 350/347 R |
| 4,984,874 | 1/1991 | Yamamoto et al. ............ | 350/339 R |
| 4,985,285 | 1/1991 | Ichikawa et al. ................ | 350/346 |
| 5,033,825 | 7/1991 | Ishikawa et al. ............... | 350/339 R |

FOREIGN PATENT DOCUMENTS 0297841  1/1989  European Pat. Off. ............ 350/346

OTHER PUBLICATIONS

"Rear-Projection TV Using High-Resolution a-Si TFT-LCD", Ikunori Kobayashi, et al. SID Digest, 1989, pp. 114–117.

"A Color STN Display with Two Retardation Compensating Films", Ohgawara, et al. SID Digest, 1989, pp. 390–393.

"Multicolor Super-Twisted Nematic LCD Using Polymer Retardation FIlm", Koukichi Ito, et al. SID Digest, 1989, pp. 394–397.

"Black and White STN-LCD Using Two Birefrigent Films", K. Kumagawa, et al. Japan Display, 1989, pp. 312–315.

"Wide Viewing Angle LCD Using Retardation Films", N. Yamagishi, et al. Japan Display, 1989, pp. 316–319.

"Optimization of Electro-Optical Properties in Achromatic Supertwisted Nematic LCD Using Birefrigent Film", I. Fukuda, et al., Japan Display, 1989, pp. 324–327.

"On the Viewing Angle Dependence of Monochrome-ST LCD Using Retardation Films", R. Watanabe, et al., Japan Display, 1989, pp. 328–331.

"Optimization of a Single-Cell Black & White ST LCD Using a Retardation Film", Japan Display, 1989, pp. 332–335.

"Film Compensated STN-LCDs with Wide Viewing Angle", M. Akatsuka, et al., Japan Display, 1989, pp. 336–339.

(List continued on next page.)

Primary Examiner—Rolf Hille
Assistant Examiner—Minhloan Tran
Attorney, Agent, or Firm—Donald S. Ingraham; James C. Davis, Jr.; Marvin Snyder

[57] ABSTRACT

A liquid crystal display device includes an entrance polarizer to provide light which is linearly polarized in a first selected direction and a first birefringent film to convert the linearly polarized light from the entrance polarizer to elliptically polarized light having a selected ellipticity. At least one liquid crystal cell having an ellipticity equal to the selected ellipticity receives the light propagating from the first birefringent film; the liquid crystal cell includes first and second parallel-facing transparent plates which sealably contain a quantity of liquid crystal material. The liquid crystal material comprises at least a first molecule immediately adjacent the first transparent plate which is oriented in the first selected direction and at least a second molecule immediately adjacent the second transparent plate which is oriented in a second selected direction. A second birefringent film converts the elliptically polarized light propagating from the at least one liquid crystal cell to light which is linearly polarized in the second selected direction. An exit polarized having a polarization axis oriented orthogonally to the second selected direction will extinguish the light propagating from the second birefringent film when the liquid crystal cell is in an "off" state.

9 Claims, 5 Drawing Sheets

OTHER PUBLICATIONS

"Achromatic Supertwisted Nematic LCD Using Birefrigent Film", Ichiro Fukuda, et al., 1988 International Display Research COnference, pp. 159-160.

"A Single-Cell High-Quality Black & White ST LCD", Shoichi Matsumoto, et al., 1988 International Display Research Conference, pp. 182-183.

"Optical Compensation of Super Twisted Nematic LCD Applied by Polymer Retardation Film", Hiroaki Odai, et al., 1988 International Display Research Conference, pp. 195-198.

LIQUID CRYSTAL DISPLAY DEVICE WITH BIREFRINGENT FILMS

BACKGROUND OF THE INVENTION

The present invention relates to liquid crystal display (LCD) devices and, more particularly, to a novel liquid crystal display device comprising a pair of birefringent films to provide a black-off state.

An LCD device typically comprises a multiplicity of picture elements, or "pixels", formed between a pair of flat panels (usually a glass substrate and a cover glass) sealably containing a quantity of twisted nematic liquid crystal material. If the LCD device is to operate by reflected light, only one of the panels need be transparent and the other panel will be formed with a reflective surface. If the LCD device is to be light transmissive, then both flat panels should be transparent. A detailed description of an LCD device structure and operation is disclosed and claimed in U.S. Pat. No. 4,646,424, issued Mar. 3, 1987, assigned to the assignee of the present invention, and incorporated herein in its entirety by reference.

Active matrix LCD pixels are usually arranged in uniform columns and rows to form an X-Y matrix structure. A semiconductor switch, such as a thin film field-effect transistor (FET) or the like, is integrally formed with each pixel to control the operation of that pixel in the display. Electrical communication with the individual pixel FETs is accomplished by a plurality of X-address lines or scan lines and a plurality of Y-address lines or data lines which are both formed during device fabrication. The scan lines are usually connected to the gate electrodes of the pixel FETs, the data lines are usually connected to one of the source or drain electrode, and the other of the source or drain electrode is connected to a pixel electrode of each pixel. Thus, a voltage of proper polarity and magnitude applied to a scan line will cause the FETs in the row corresponding to the scan line to "switch-on" to a conducting state. If a data voltage is applied to a data line while an FET in the column corresponding to the data line is in an "on" state, the alignment of the liquid crystal molecules is altered depending upon the magnitude of the data voltage applied between the pixel electrode and a ground plane electrode common to all pixels. The data voltage magnitude may be such as to: allow no light transmission through the pixel (off); allow maximum light transmission through the pixel (on); or provide an intermediate gray scale level of light transmission. Ideally, a pixel in the "off" state should completely block out any light transmission and look black for the display to exhibit the desired contrast and resolution.

The elongated molecules of the twisted nematic (TN) liquid crystal material will cause the polarization of light propagating through the LCD to rotate by an angle $\theta$ corresponding to the change in orientation or alignment of the liquid crystal (LC) molecules between the pair of flat panels. Each of the liquid crystal molecules has a longitudinal axis; the longitudinal axes of the LC molecules closest to the entrance panel (or glass substrate) will be oriented in one direction (for example $\theta_1 = 0°$) and the longitudinal axes of subsequent LC molecules between the pair of flat panels will each be rotated an incremental angle ($\Delta\theta$) relative to the axes of the immediately proceeding molecules ($\theta_n = \theta_{n-1} + \Delta\theta$). The last LC molecules closest to the exit panel (or cover glass) will then be oriented at an angle (for example $\theta_n = 90°$) relative to the first LC molecules The angle between the first molecules and the last molecules is commonly known as the twist angle of the LC cell. For a thick LCD device having a twist angle of 90°, with linear entrance and exit polarizers, each having parallel polarization alignment, and each respectively placed adjacent the LCD entrance and exit panels, a dark output will be provided from each pixel that is in the "off" state. The entrance polarizer will pass or excite one of the two normal modes and block the other mode of the linearly polarized propagating light. The LC molecules will rotate this mode 90° as the light propagates through the LC cell and the exit polarizer, which is aligned parallel to the entrance polarizer, will block this rotated mode of the propagating light.

In thin LCDs, such as the fast displays required for color video, or in highly twisted cells ($\theta = 270°$), such as the highly multiplexable super-twist displays, the "off" state is not black because the two normal modes of light propagating in the LCD are elliptically polarized as a result of the optical rotation and birefringence of the TN molecules; thus, both modes are excited and, when exiting the cell, cannot be completely blocked with a linear exit polarizer. The degree of ellipticity ($\beta$) of the two normal modes of a LC cell is expressed by the equation:

$$\beta = \frac{1}{2} \arctan\left(\frac{2\lambda}{\Delta n p}\right)$$

where $\lambda$ is the light wavelength, $\Delta n$ is the LC birefringence and p is the pitch of the twisted LC molecules. The pitch is directly proportional to the thickness (d) of the LC cell; for a 90° twisted nematic cell, p=4d and the ellipticity equation becomes:

$$\beta = \frac{1}{2} \arctan\left(\frac{\lambda}{2\Delta n d}\right).$$

The azimuth of the two normal modes of light propagating through the LC cell are each respectively parallel and perpendicular to the LC molecular direction; therefore, the two normal modes will be rotated by the twist angle of the LC cell.

In color LCDs, different colored light, each at a different wavelength ($\lambda$), will, therefore, have a different elliptical polarization or ellipticity ($\beta$) upon exiting the LCD. The color LCD can be designed with a special combination of LC birefringence ($\Delta n$), cell thickness (d) and cell twist angle ($\theta$) to provide a minimum transmission of light at a particular wavelength, such as green light ($\lambda g = 540$ nm) but considerable light will leak through at the red ($\lambda r = 640$ nm) and blue ($\lambda b = 470$ nm) wavelengths to make the "off" state appear colored or not black.

Prior art devices have been proposed which utilize a single birefringent film (BF) disposed in an optical path after the LCD to produce a more neutral "off" state. These single BFs require precise orientation of the film to optimize the neutral color "off" state and also have retardations (i.e. the product of the birefringence, $\Delta n'$, of the film and the thickness, d', of the film) greater than about 300 nm for optimum performance with LC cells of various pitch, birefringence and polarizer orientations. LCD devices with a single large-retardation-value BF are quite performance sensitive to polarization orientation, BF orientation and LC cell thickness. All of these parameters must be properly coordinated to optimize the dark output during the "off" state.

It is accordingly a primary object of the present invention to provide a novel liquid crystal display device which is not subject to the foregoing disadvantages.

It is a further object of the present invention to provide a liquid crystal display device with a black output "off" state for all wavelengths of colored light.

It is another object of the present invention to provide a liquid crystal display device which is insensitive to LC cell thickness, polarizer orientation, birefringent film orientation and viewing angle.

These and other objects of the invention, together with the features and advantages thereof, will become apparent from the following detailed description when read with the accompanying drawings in which like reference numerals refer to like elements.

SUMMARY OF THE INVENTION

In accordance with the present invention, a liquid crystal display device includes a liquid crystal (LC) cell having a selected ellipticity, and first and second substantially parallel transparent plates with nematic liquid crystal material sealably contained between the plates. The LC material has molecules adjacent the first plate which are oriented in a first selected direction and molecules adjacent the second plate which are oriented in a second selected direction; the second selected direction is rotated at a twist angle relative to the first selected direction. A first polarizer is disposed substantially parallel to the first LC cell plate and is aligned to pass light linearly polarized in the first selected direction; a second polarizer is disposed substantially parallel to the second LC cell plate and is aligned orthogonally to the second selected direction to block light linearly polarized in the second selected direction. A first birefringent film is disposed between the first polarizer and the first LC cell plate and a second birefringent film is disposed between the second LC cell plate and the second polarizer. The first birefringent film has a selected birefringence and fast axis orientation to convert linearly polarized light propagating from the first polarizer into elliptically polarized light with substantially the same ellipticity as a normal mode of light propagating in the LC cell. This normal mode will undergo only optical rotation equal to the twist angle of the LC cell and will not change ellipticity as the light propagates through the cell. The second birefringent film has a selected birefringence and fast axis orientation to convert the elliptically polarized light back to light that is linearly polarized in the second selected direction and therefore extinguishable by the second polarizer when the LC cell is in an "off" state.

In a presently preferred embodiment, each birefringent film (BF) preferably has a retardation less than about 100 nanometers and each BF is preferably oriented with its fast axis rotated about 45° relative to the orientation of the LC molecule at the LC cell plate closest to the respective film.

DETAILED DESCRIPTION OF THE PREFERRED EMBODIMENT

Figure 1:
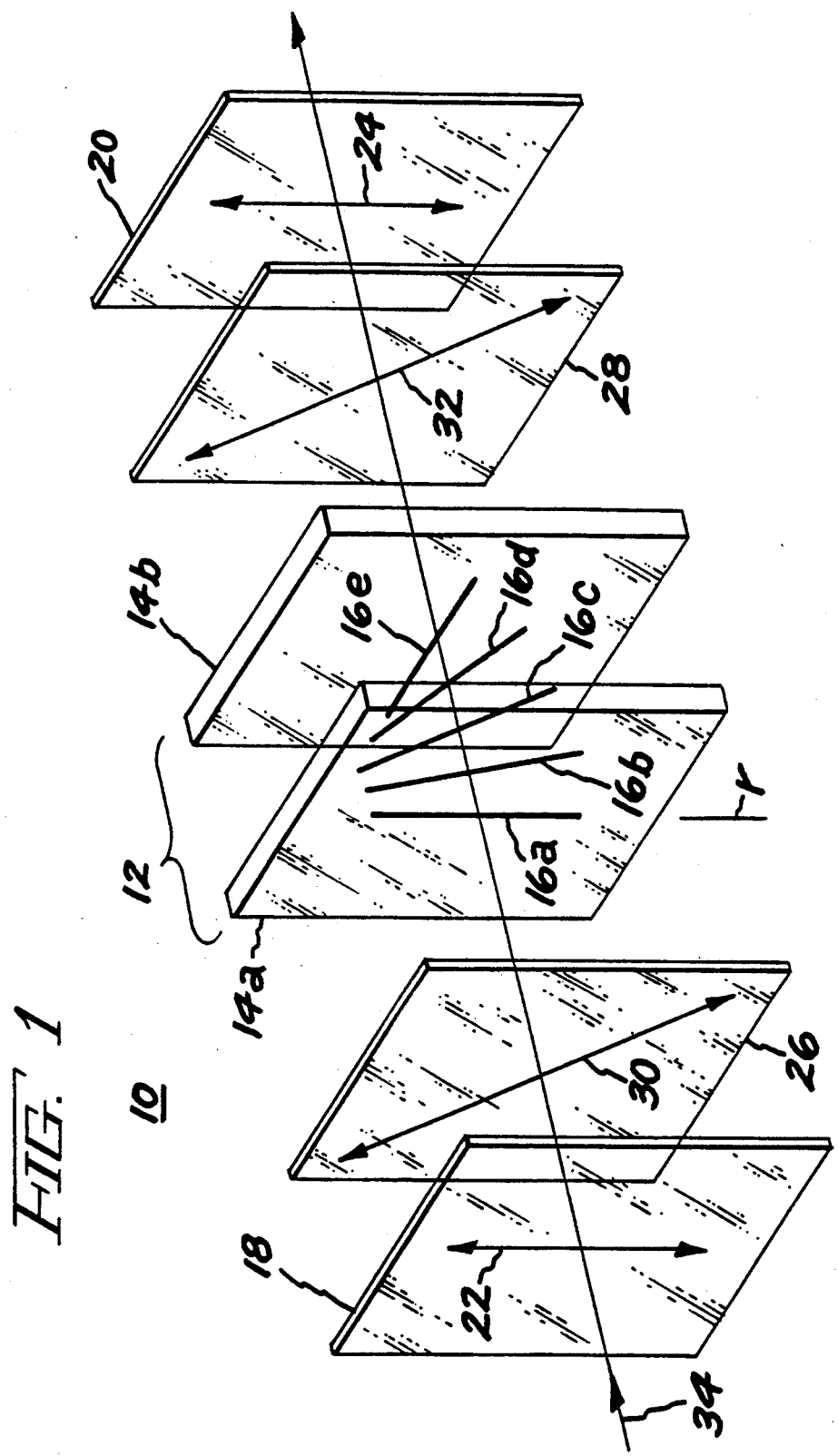
FIG. 1 is a schematic view of a liquid crystal display device in accordance with an embodiment of the present invention.

Referring to FIG. 1, a liquid crystal display (LCD) device 10 includes a liquid crystal cell 12 which comprises two parallel flat transparent plates 14a and 14b, preferably of glass, sealably containing a quantity of nematic liquid crystal material. The LC material includes a multiplicity of LC molecules 16 which are divided into groups; the LC molecules in each group are oriented relative to each other to form a twisted structure between plates 14a and 14b. A first LC molecule 16a (only one group is shown in FIG. 1 for explanation purposes), adjacent a first or entrance plate 14a, is oriented in a selected direction ($\theta_1 = 0°$) with respect to a reference line r. Each subsequent LC molecule 16b, 16c, 16d and 16e will have an incremental angle ($\Delta\theta$) of orientation relative to the immediately preceding molecule ($\theta_n = \theta_{n-1} + \Delta\theta$) and the last LC molecule 16e, closest to second or exit plate 14b will be oriented at an angle ($\theta_n = 90°$) relative to first molecule 16a. The difference between the angle or orientation of first molecule 16a and last molecule 16e is the twist angle of the LC cell. A twist angle of 90° is shown in FIG. 1 for ease of illustration and the present invention may be used as well with LC cells having different twist angles, such as supertwisted nematic cells ($\theta = 270°$) and the like. Those skilled in the art will recognize that a plurality of LC molecules 16 will be disposed between plates 14a and 14b and that only five molecules are shown in FIG. 1 for clarity.

Light propagating through LC cell 12 will be a linear combination of the two normal modes of the LC cell. The two normal modes are elliptically polarized by LC cell 12 and will have ellipticity $\beta$, which is a function of the light wavelength ($\lambda$), the birefringence ($\Delta n$) of the cell and the pitch (p) of the LC molecules in the twisted nematic structure between entrance plate 14a and exit plate 14b.

In operation, LC display 10 operates like a camera shutter to control the quantity of light passing through device 10. LC cell 12 may be energized to an "on" state to allow light transmission or not energized and in an "off" state; ideally, the LC cell in the "off" state should completely block out any light transmission and look black for the display to exhibit the desired contrast, but some light at different wavelengths may leak through the LC cell.

A front or entrance polarizer 18 is disposed substantially parallel to entrance plate 14a and a rear or exit polarizer 20 is disposed substantially parallel to exit plate 14b. Entrance polarizer 18 has a polarization or transmission direction (indicated by arrows 22) that preferably corresponds to the orientation direction of first LC molecule 16a and exit polarizer 20 has a transmission direction (indicated by arrows 24) that is preferably orthogonal to last LC molecule 16e to minimize the amount of light transmission through device 10 in the "off" state. Device 10 would work as well if the entrance and exit polarizers were rotated 90° and thereby coupled to the other of the two normal modes of LC cell 12.

In accordance with the present invention, a first birefringent film (BF) 26 is disposed between entrance polarizer 18 and LC cell entrance plate 14a and substantially parallel to both; a second birefringent film 28 is also disposed between exit plate 14b and exit polarizer 20 and substantially parallel to each. First birefringent film 26 has a selected birefringence ($\Delta n'_1$) and a fast axis (shown by arrows 30) oriented in a selected direction to transform linear polarized light from entrance polarizer 18 into elliptically polarized light with ellipticity $\beta$ and azimuth $\alpha$ which both correspond to one of the two normal modes of LC cell 12. Second birefringent film 28 has a selected birefringence ($\Delta n'_2$) and a fast axis (arrows 32) oriented in a selected direction to cause elliptically polarized light exiting LC cell 12 to be transformed into linearly polarized light that is orthogonal to the transmission direction 24 of exit polarizer 20; therefore, exit polarizer 20 will absorb the light and the output of device 10 will appear black when LC cell 12 is in an unexcited "off" state. Fast axis 30 of first birefringent film 26 is preferably oriented at an angle of about 45° relative to both the entrance polarizer direction (arrows 22) and the orientation direction of first LC molecule 16a, and fast axis 32 of second birefringent film 28 is preferably oriented at an angle of about 45° relative to both the exit polarizer direction (arrows 24) and the orientation direction of last LC molecule 16e. These orientation directions of the birefringent films permit the use of birefringent films with small values of birefringence or retardation; small retardation values minimize the color or wavelength dispersion of the device and cause the output at exit polarizer 20 to be black in the "off" state. These orientation directions also permit the birefringence of both birefringent films 26 and 28 to be substantially equal. The polarization directions in FIG. 1 are merely for purposes of illustration and other directions can be used as well provided the relative polarization directions of the different constituents are maintained substantially as described above for optimum performance.

Figure 2:
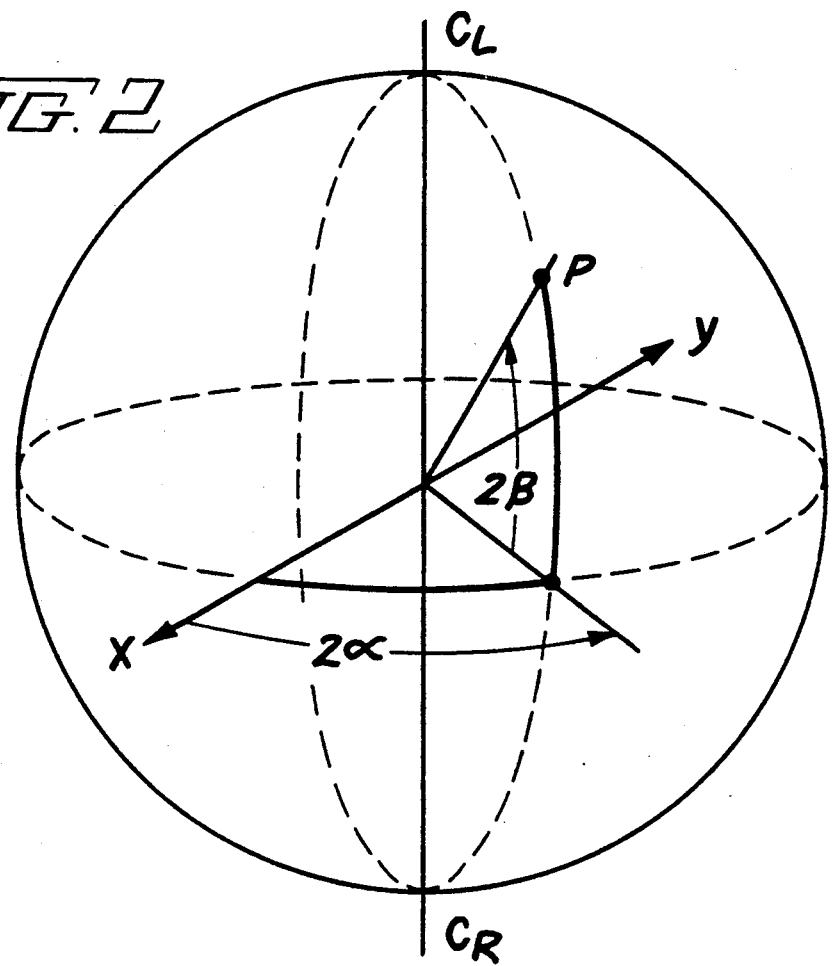
FIG. 2 is a Poincaré sphere diagram showing an elliptical polarization state.
Figure 3:
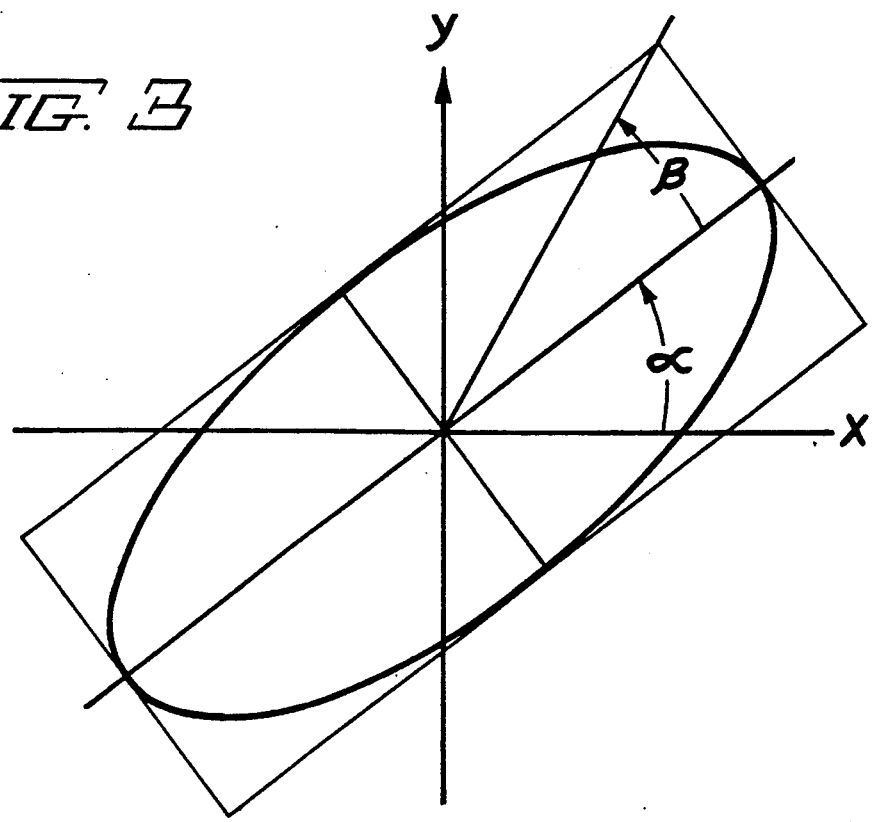
FIG. 3 is a graph of an elliptical polarization state on an orthogonal coordinate system.

Operation of LCD device 10 can most easily be described by use of a Poincaré sphere graphical analysis which is described in many optics textbooks, such as *Principles of Optics* by M. Born and E. Wolf (Pergamon, Oxford, 1965). Briefly described, any polarization state of propagating light can be represented by a point on the surface of a Poincaré sphere diagram (FIG. 2). The equator of the sphere is the locus of all linearly polarized states and the poles, $C_L$ and $C_R$, respectively, represent the left- and right-handed circular polarized states. All other points on the Poincaré sphere surface represent elliptical polarization states. For example, an elliptical polarization state may be represented on an X-Y orthogonal coordinate system (FIG. 3) as some azimuth $\alpha$ and ellipticity $\beta$. This same elliptical polarization state would be represented by the point P($2\alpha$, $2\beta$) on the Poincaré sphere diagram (FIG. 2). All angles are doubled when transferred from an orthogonal coordinate system to the Poincaré sphere and the X-Y axis is rotated from 90° to 180°.

Figure 4:
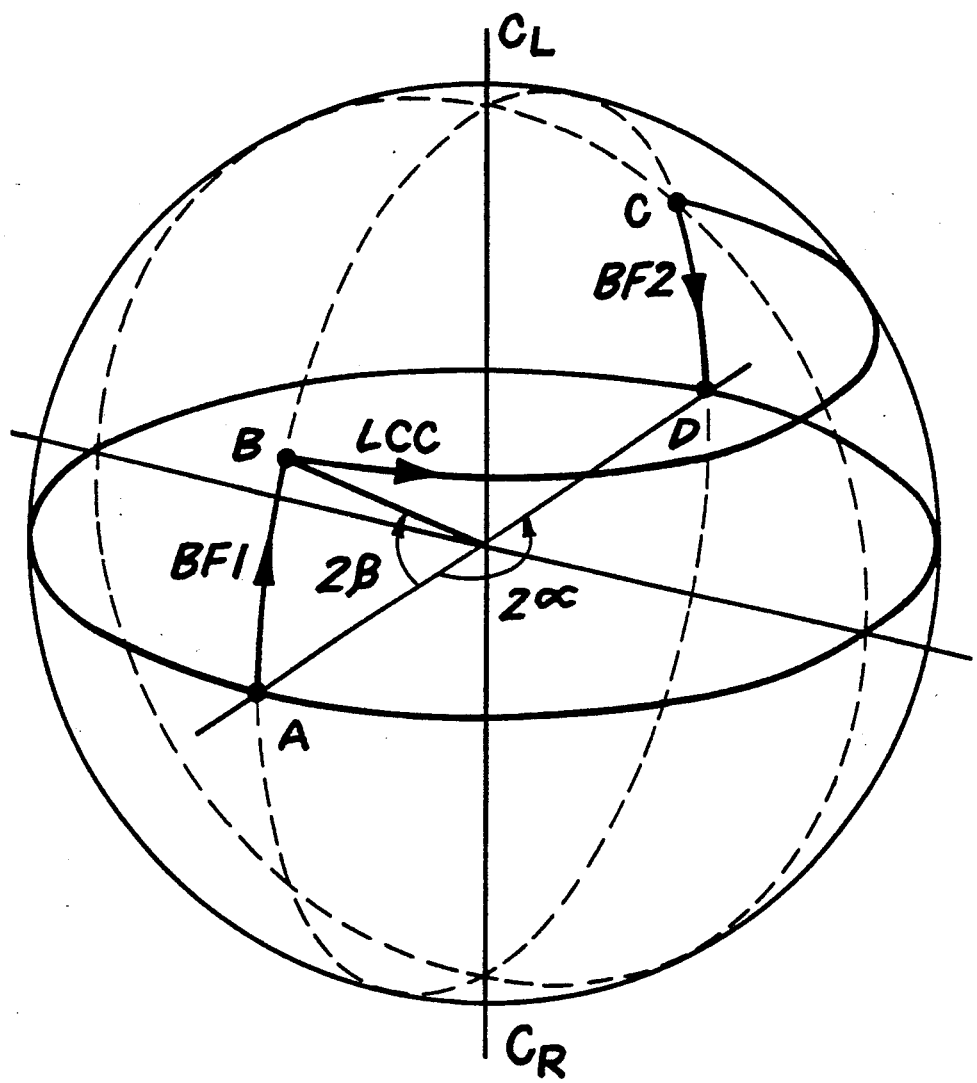
FIG. 4 is a Poincaré sphere diagram showing the state of polarization of light propagating through the LCD device of FIG. 1.

Linearly polarized light preferably propagates through LCD device 10 in the direction indicated by arrow 34 (FIG. 1). Entrance polarizer 18 will pass that one mode, of the two normal modes of linearly polarized light, which corresponds to the polarization orientation 22 of entrance polarizer 18, and will block the other normal mode. The linear polarization state at the output of entrance polarizer 18 may be represented by point A on the Poincaré sphere (FIG. 4). First birefringent film 26 will convert the linearly polarized light to elliptically polarized light having an azimuth of zero ($\alpha = 0$) and an ellipticity ($\beta$) equal to the ellipticity of the LC cell; this elliptical polarization state is represented by point B ($0, 2\beta$). Only one normal mode of LC cell 12 is excited because light exiting first birefringent film 26 has substantially the same ellipticity and azimuth as the normal mode of LC cell 12; therefore, this elliptically polarized normal mode will undergo pure optical rotation equal to the twist angle of LC cell 12. For a twist angle of 90° ($2\alpha = 180°$), the polarization state at the output of LC cell 12 will be point C (180, $2\alpha$). Second birefringent film 28 will convert the elliptically polarized light to a linearly polarized state at point D because second birefringent film 28 has selected birefringence ($\Delta n'_2$) and selected fast axis 32 orientation to rotate the polarization state back to the equator of the Poincaré sphere at point D ($2\alpha$, 0). The linear polarized light at point D will have a polarization direction equal to the orientation direction of last LC molecule 16e. Exit polarizer 20 will extinguish the linear polarized light and the output of LCD device 10 will be black in the "off" state because exit polarizer 20 is oriented orthogonally to last LC molecule 16e (FIG. 1).

Figure 5A:
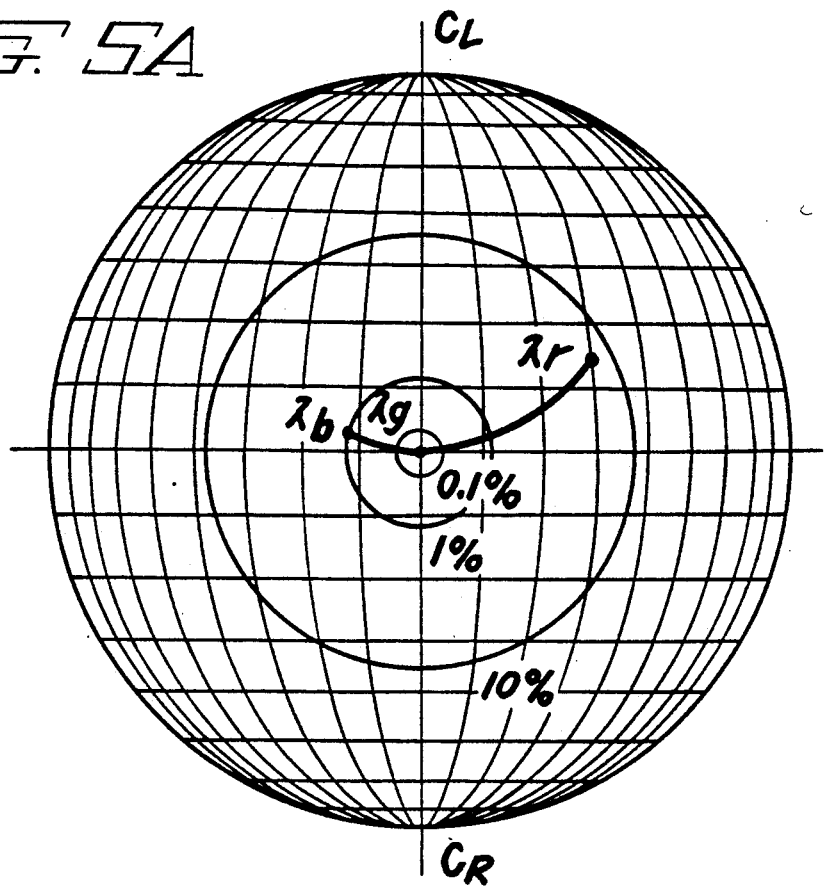
FIG. 5A is a Poincaré sphere diagram showing the percentage of light transmission through an LCD device without birefringent films.
Figure 5B:
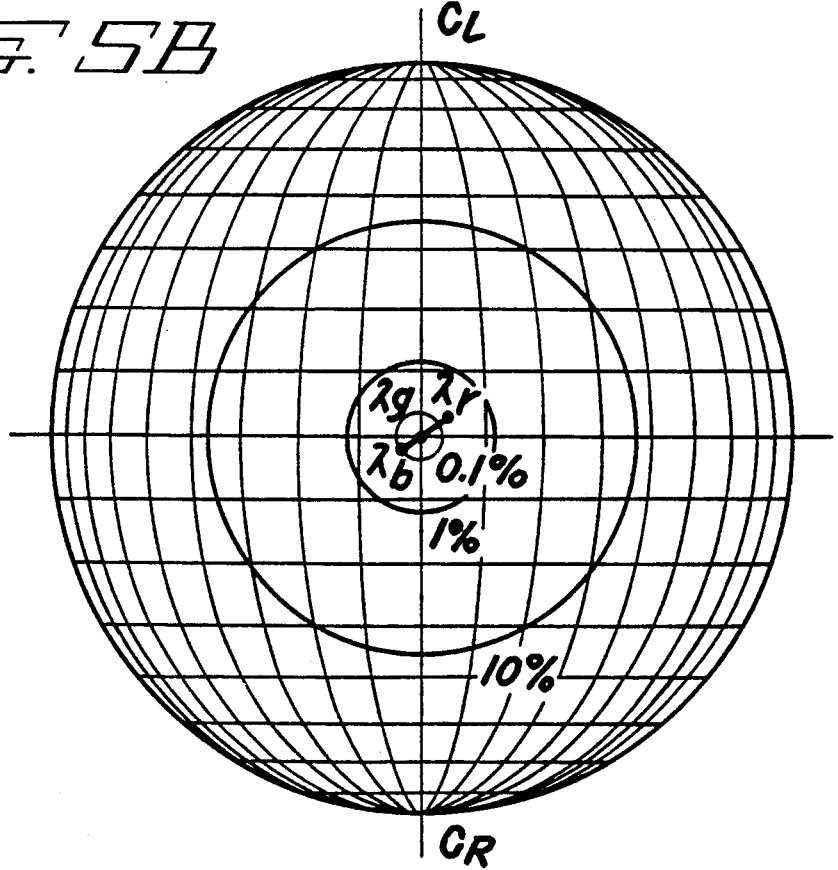
FIG. 5B is a Poincaré sphere diagram showing the percentage of light transmission through an LCD device in accordance with the present invention.

The elliptical polarization of different colored light propagating through the birefringent films and the LC cell will vary because the ellipticity of light propagating through these constituents is a function of the wavelength of the light. The percentage of light transmission for different colored light at the output of exit polarizer 20 may be graphically estimated using Poincaré sphere diagrams (FIGS. 5A and 5B) and looking back into exit polarizer 20. Constant transmission contours for 0.1%, 1% and 10% light transmission are superimposed on FIGS. 5A and 5B FIG. 5A is for an LCD device without birefringent films 26 and 28 but the LC cell is designed with a particular combination of LC birefringence ($\Delta n$), cell thickness (d) and cell twist angle ($\theta = 90°$) to satisfy the Gooch-Tarry minimum condition ($\Delta nd/\lambda = (\frac{1}{2}) \sqrt{4m^2 - 1}$, where m = 1, 2, 3) and to provide a minimum transmission of green light ($\lambda_g = 540$ nm) in the "off" state. Without the birefringent films about 1% of blue light ($\lambda_b = 470$ nm) leaks through device 10 in the "off" state and almost 10% of red light ($\lambda_r = 640$ nm). With the birefringent films, leakage of the red and blue light can be limited to less than about 0.5% (FIG. 5B).

Figure 6:
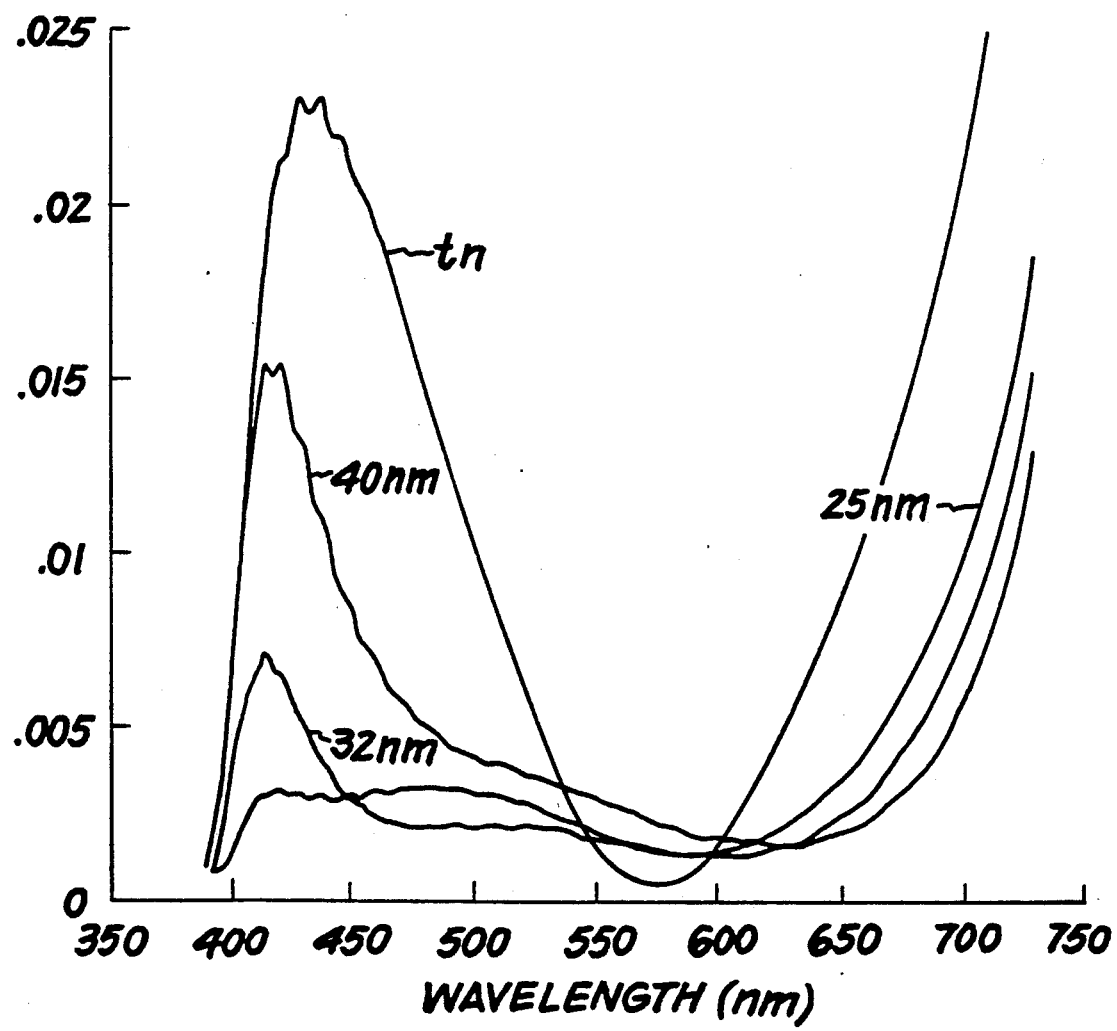
FIG. 6 is a graph of the measured percentage of light transmission in the "off" state versus wavelength for the liquid crystal display device of FIG. 1 with birefringent films having different retardations.

FIG. 6 shows percentage light transmission versus wavelength for a 90° twisted nematic LC cell filled with Merck ZLI-3376 ® liquid crystal material having a $\Delta n$ of 0.085 at a wavelength of 590 nm and a cell thickness of about 5.9 μm. Graphs are shown for the LC cell without birefringent films (tn) and with birefringent films having retardations of about 25, 32 and 40 nm. The birefringent films were formed by stretching a polymer sheet over a thin glass substrate and bonding the sheet to the substrate with an ultra-violet curable adhesive to maintain a stable retardation. The output of exit polarizer 20 is below about 0.5% over most of the visible light spectrum for the LCD devices with birefringent films 26 and 28 and the output was substantially black for the "off" state. These results are superior to the results obtained with prior art devices which utilized a single birefringent film having retardations of several hundred nanometers. The birefringent films with retardations below about 100 nm also appear to be relatively insensitive to LC cell thickness, polarizer orientation, birefringent film orientation, viewing angle and different wavelengths.

It will be readily understood by those skilled in the art that the present invention is not limited to the specific embodiments described and illustrated herein. Different embodiments and adaptations besides those shown herein and described, as well as many variations, modifications and equivalent arrangements, will now be apparent or will be reasonably suggested by the foregoing specification and drawings, without departing from the substance or scope of the invention While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A liquid crystal display device comprising:
   an entrance polarizer having a polarization axis for linearly polarizing in a first selected direction light entering said device;
   a first birefringent film disposed adjacent to and substantially parallel to said entrance polarizer to convert the linearly polarized entering light to elliptically polarized light having a selected ellipticity $\beta$, said first film having a maximum retardation of 100 nanometers;
   at least one liquid crystal cell disposed substantially parallel to said first birefringent film and adjacent thereto, said cell having a normal mode ellipticity substantially equal to said selected ellipticity $\beta$ and being capable of rotating said elliptically polarized light entering said cell from said first selected direction to a second selected direction when said cell is in a non-energized "off" state, the angle of rotation imparted to said light corresponding to the twist angle of said cell;
   a second birefringent film disposed adjacent to and substantially parallel to said liquid crystal cell for converting elliptically polarized light emerging from said liquid crystal cell to light which is linearly polarized in said second selected direction, said second film having a maximum retardation of 100 nanometers; and
   an exit polarizer disposed adjacent to and substantially parallel to said second birefringent film and having a polarization axis disposed substantially orthogonal to said second selected direction, whereby light emerging from said second birefringent film is extinguished when said liquid crystal cell is in the "off" state.

2. The device of claim 1, wherein said normal mode ellipticity of said liquid crystal cell is selected to cause a chosen wavelength of light to be completely blocked by said exit polarizer.

3. The device of claim 1, wherein each of said first and second birefringent films comprises:
   a glass substrate; and
   a sheet of polymer material stretched across said glass substrate and bonded to said substrate by an ultraviolet curable adhesive to provide a stable retardation.

4. The device of claim 1, wherein each of said first and second birefringent films has a fast axis, each of said fast axis being oriented in the same direction.

5. The device of claim 4, wherein said first birefringent film fast axis is oriented at about 45° relative to said polarization axis of said entrance polarizer and said first selected direction respectively, and said second birefringent film fast axis is oriented at about 45° relative to said polarization axis of said exit polarizer and said second selected direction respectively.

6. The device of claim 1, wherein each of said first and second birefringent films has a retardation of about 25 nanometers.

7. The device of claim 1, wherein said second birefringent film has a birefringence selected to convert light with said selected ellipticity $\beta$ to linearly polarized light.

8. The device of claim 1, wherein said liquid crystal cell has a twist angle of about 90°.

9. The device of claim 1, wherein said liquid crystal cell comprises a super twisted nematic material.

* * * * *